(12) United States Patent
Yoda (10) Patent No.: US 10,091,384 B2
(45) Date of Patent: Oct. 2, 2018

(54) IMAGE STORAGE DEVICE FOR STORING SEPARATELY READ IMAGES IN ONE FILE, IMAGE STORAGE SYSTEM, NON-TRANSITORY COMPUTER READABLE MEDIUM, AND IMAGE STORAGE METHOD

(71) Applicant: FUJI XEROX CO., LTD., Tokyo (JP)

(72) Inventor: Akira Yoda, Yokohama (JP)

(73) Assignee: FUJI XEROX CO., LTD., Tokyo (JP)

( * ) Notice: Subject to any disclaimer, the term of this patent is extended or adjusted under 35 U.S.C. 154(b) by 53 days.

(21) Appl. No.: 15/222,142

(22) Filed: Jul. 28, 2016

(65) Prior Publication Data

US 2017/0208202 A1    Jul. 20, 2017

(30) Foreign Application Priority Data

Jan. 18, 2016   (JP) .................................. 2016-007001

(51) Int. Cl.
*H04N 1/00*   (2006.01)
*H04N 1/21*   (2006.01)

(52) U.S. Cl.
CPC ....... *H04N 1/2104* (2013.01); *H04N 1/00013* (2013.01); *H04N 1/00411* (2013.01); *H04N 2201/0081* (2013.01); *H04N 2201/0094* (2013.01)

(58) Field of Classification Search
None
See application file for complete search history.

(56) References Cited

U.S. PATENT DOCUMENTS

| 6,069,707 | A  | * | 5/2000  | Pekelman | .......... | H04N 1/00278 |
|           |    |   |         |          |            | 358/1.13     |
| 6,728,419 | B1 | * | 4/2004  | Young    | ................ | H04N 1/00002 |
|           |    |   |         |          |            | 382/276      |
| 8,120,809 | B2 | * | 2/2012  | Mori     | ....................... | G06F 17/24 |
|           |    |   |         |          |            | 358/1.15     |
| 8,289,583 | B2 | * | 10/2012 | Hattori  | ............... | H04N 1/00222 |
|           |    |   |         |          |            | 358/404      |

(Continued)

FOREIGN PATENT DOCUMENTS

JP    2009-272677 A    11/2009

OTHER PUBLICATIONS

Item titled "Scan multiple pages into one file instead of each scan being saved as a separate file" in section titled "FAQs & Troublesooting", pubished on Oct. 6, 2015 on website http://support.brother.com.*

(Continued)

*Primary Examiner* — Paul F Payer
(74) *Attorney, Agent, or Firm* — Oliff PLC (57) ABSTRACT

An image storage device includes: a receiving unit that receives a first image read according to a first operation from an image reader and receives a second image read according to a second operation from the image reader, the second operation subsequent to the first operation; a display that displays the first image when the receiving unit receives the first image, and further displays the second image when the receiving unit receives the second image; and a memory that, when the first image and the second image are instructed to be stored in a state where the first image or the second image is displayed on the display, stores a file into which the first image and the second image are integrated.

12 Claims, 9 Drawing Sheets

(56) References Cited

U.S. PATENT DOCUMENTS

| | | | | |
|---|---|---|---|---|
| 8,325,369 B2* | 12/2012 | Miyazawa | ......... | H04N 1/00222 |
| | | | | 358/1.15 |
| 8,326,989 B2* | 12/2012 | Yamamoto | .......... | G06F 17/3028 |
| | | | | 709/223 |
| 8,547,605 B2 | 10/2013 | Hattori | | |
| 8,867,091 B2* | 10/2014 | Matsushita | ........ | H04N 1/00241 |
| | | | | 358/1.1 |
| 9,560,233 B2* | 1/2017 | Hanano | .............. | H04N 1/00962 |
| 2009/0273815 A1 | 11/2009 | Hattori | | |
| 2013/0010337 A1 | 1/2013 | Hattori | | |
| 2014/0002867 A1 | 1/2014 | Hattori | | |

OTHER PUBLICATIONS

Item titled "Scan multiple pages into one file instead of each scan being saved as a separate file" in section titled "FAQs & Troubleshooting", published on Oct. 6, 2015 on website http://support.brother.com.*

* cited by examiner

IMAGE STORAGE DEVICE FOR STORING SEPARATELY READ IMAGES IN ONE FILE, IMAGE STORAGE SYSTEM, NON-TRANSITORY COMPUTER READABLE MEDIUM, AND IMAGE STORAGE METHOD

CROSS-REFERENCE TO RELATED APPLICATIONS

This application is based on and claims priority under 35 USC 119 from Japanese Patent Application No. 2016-007001 filed on Jan. 18, 2016.

BACKGROUND OF THE INVENTION

The present invention relates to an image storage device, an image storage system, a non-transitory computer readable medium, and an image storing method.

SUMMARY

According to an aspect of the invention, there is provided an image storage device including: a receiving unit that receives a first image read according to a first operation from an image reader and receives a second image read according to a second operation from the image reader, the second operation subsequent to the first operation; a display that displays the first image when the receiving unit receives the first image, and further displays the second image when the receiving unit receives the second image; and a memory that, when the first image and the second image are instructed to be stored in a state where the first image or the second image is displayed on the display, stores a file into which the first image and the second image are integrated.

BRIEF DESCRIPTION OF THE DRAWINGS

Exemplary embodiments of the present invention will be described in detail based on the following figures, wherein.

DETAILED DESCRIPTION OF THE INVENTION

Hereinafter, an exemplary embodiment of the invention will be described in detail with reference to the accompanying drawings.

[Entire Configuration of Image Reading System]

Figure 1:
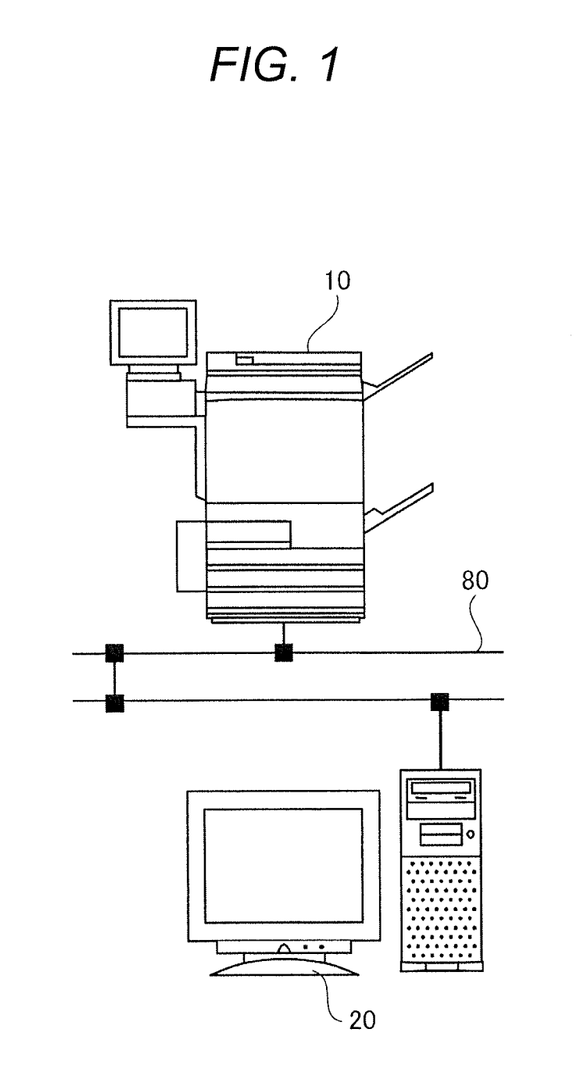
FIG. 1 is a diagram illustrating an instance of an entire configuration of an image reading system to which an exemplary embodiment of the invention is applied.

FIG. 1 illustrates an instance of the entire configuration of an image reading system to which the exemplary embodiment is applied. As illustrated in the drawing, the image reading system is an instance of an image storage system, and includes an image reader 10 and a terminal device 20 which are connected to each other by a communication line 80.

The image reader 10 is an apparatus which reads an image from an original document. The read image is transferred to the terminal device 20 by a pseudo push scan. Herein, the pseudo push scan is to take the image read by the terminal device 20 from the image reader 10 by a pull scan according to a request from the image reader 10. Strictly speaking, the pseudo push scan is different from the push scan, but will be called "push scan" in this specification. In other words, when a user sets the original document in a platen or an automatic document feeder and presses a scan button, the image reader 10 issues a push scan event to the terminal device 20. When the terminal device 20 instructs an image reading in response, the image is read from the original document and transmitted to the terminal device 20. While the image reader 10 may have only a scan function, the description in the following will be made on an assumption that the image reader 10 has a printer function, a copy function, and a facsimile function in addition to the scan function.

The terminal device 20 is a computer which is used when the user edits and stores the image read by the image reader 10. The terminal device 20 includes a resident service in which the push scan event is receivable. As such a resident service, there is WIA (Windows (registered trademark) Imaging Acquisition). When the push scan event is issued by the image reader 10, the resident service in the terminal device 20 performs an image read by the pull scan on the image reader 10. Further, a PC (Personal Computer) may be used as the terminal device 20.

The communication line 80 is a communication unit used for information communication between the image reader 10 and the terminal device 20. A LAN (Local Area Network) or the Internet may be used as the communication line 80. Alternatively, the information communication between the image reader 10 and the terminal device 20 may be performed through a transmission path in conformity to USB (Universal Serial Bus) in place of the communication line 80.

[Hardware Configuration of Image Reader]

Figure 2:
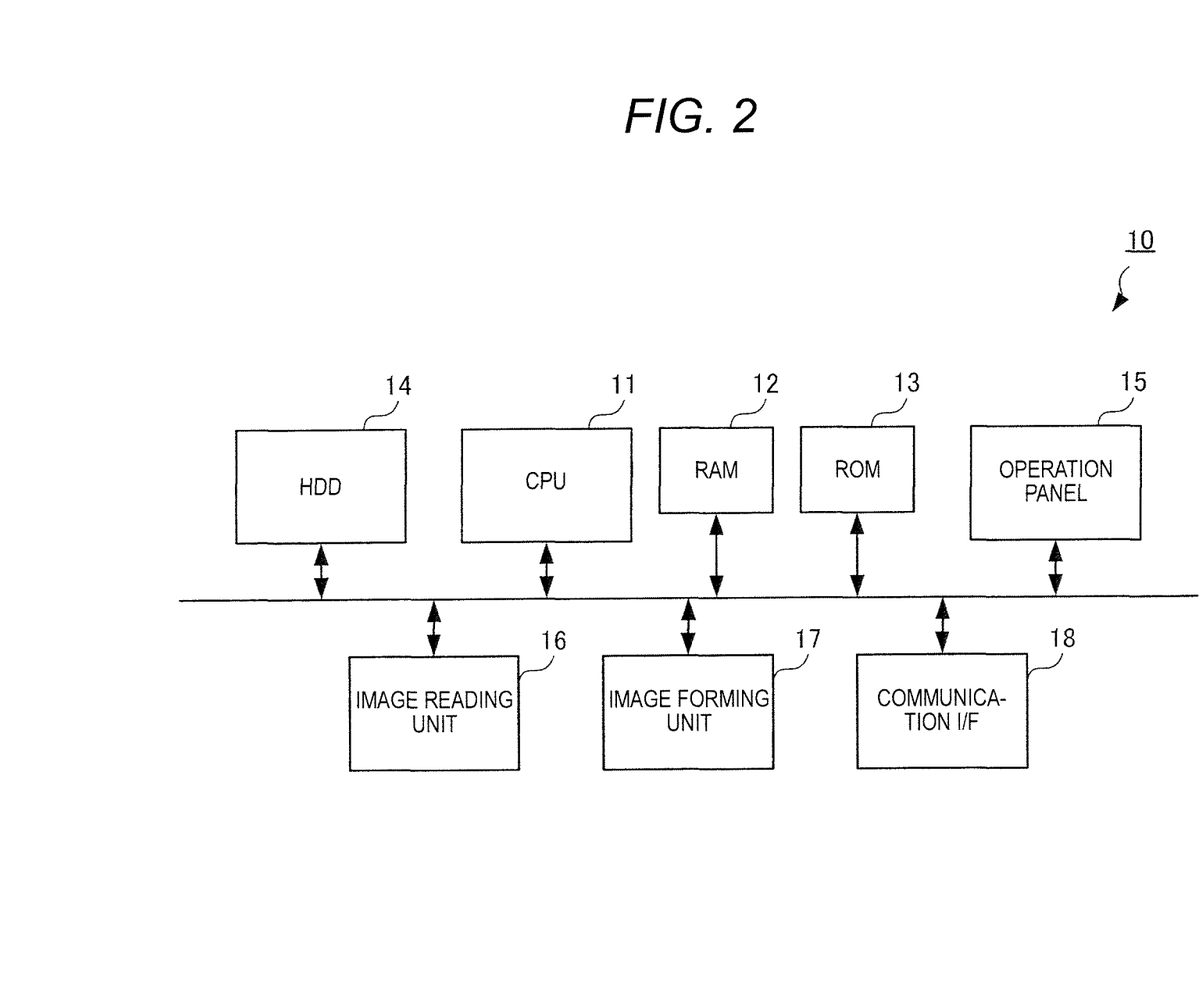
FIG. 2 is a diagram illustrating an instance of a hardware configuration of an image reader according to the exemplary embodiment of the invention.

FIG. 2 is a diagram illustrating an instance of a hardware configuration of the image reader 10 according to this exemplary embodiment. Illustrated in the drawing, the image reader 10 is provided with a CPU (Central Processing Unit) 11, a RAM (Random Access Memory) 12, a ROM (Read Only Memory) 13, an HDD (Hard Disk Drive) 14, an operation panel 15, an image reading unit 16, an image forming unit 17, and a communication interface (hereinafter, denoted as "communication I/F") 18.

The CPU 11 loads various programs stored in the ROM 13 onto the RAM 12 to realize various functions to be described below.

The RAM 12 is a memory which is used as a work memory of the CPU 11.

The ROM 13 is a memory which stores various programs executed by the CPU 11.

The HDD 14 is, for instance, a magnetic disk device which stores image data read by the image reading unit 16 and image data used in image formation in the image forming unit 17.

The operation panel 15 is, for instance, a touch panel which displays various types of information and receives operation input from the user. Herein, the operation panel 15 is configured with a display which displays various types of information, and a position detection sheet which detects a position touched by a finger or a stylus pen. Alternatively, a display and a keyboard may be used in place of the touch panel.

The image reading unit 16 is an instance of a reading unit, and reads an image stored in a recording medium such as a paper. Herein, the image reading unit 16 is a scanner, for instance. There may be employed a CCD (Charge Coupled Devices) system in which reflected light for light reflected on the original document from a light source is reduced using a lens to be received by a CCD, and a CIS (Contact Image Sensor) system in which the light sequentially illuminated on the original document from an LED light source is received using a CIS.

The image forming unit 17 forms an image in the recording medium. Herein, the image forming unit 17 is a printer, for instance. There may be employed an electrophotographic system in which toner attached on a photoconductor is transferred onto the recording medium to form an image, and an inkjet system in which ink is ejected onto the recording medium to form an image.

The communication I/F 18 transmits and receives various types of information with other devices through the communication line 80.

[Hardware Configuration of Terminal Device]

Figure 3:
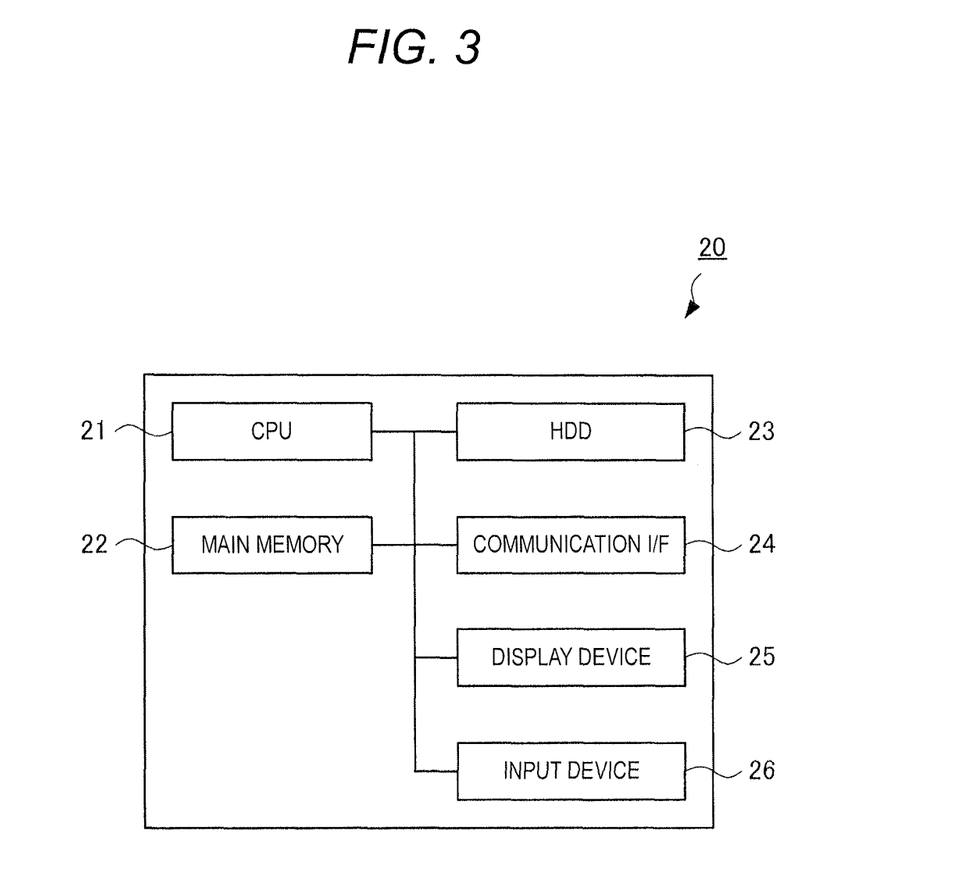
FIG. 3 is a diagram illustrating an instance of a hardware configuration of a terminal device according to the exemplary embodiment of the invention.

FIG. 3 is a diagram illustrating an instance of a hardware configuration of the terminal device 20 according to this exemplary embodiment. As illustrated in the drawing, the terminal device 20 is provided with a CPU 21, a main memory 22, an HDD 23, a communication I/F 24, a display device 25, and an input device 26.

For instance, the CPU 21 realizes the functions of the terminal device 20 by loading various types of programs stored in the HDD 23 into the main memory 22 and executing the loaded programs.

The main memory 22 is a memory which is used as a work memory of the CPU 21.

The HDD 23 is a memory which stores various types of programs executed by the CPU 21 and data created or acquired by the terminal device 20.

The communication I/F 24 transmits and receives various types of information with other devices through the communication line 80.

The display device 25 is a device which displays various types of information output from the inside of the terminal device 20. Herein, for instance, a liquid crystal display may be used as a display device.

The input device 26 is a device which receives information input by the user, and inputs the information into the terminal device 20.

[Outline of this Exemplary Embodiment]

In this exemplary embodiment, when the resident service such as WIA service receives the push scan event in the terminal device 20, two arguments are transferred to activate an application program.

Herein, the image reader 10 which issues the push scan event is designated in a first argument in the two arguments.

For instance, a device ID for identifying the image reader 10 registered in the OS is transferred as the first argument. In addition, a type of the push scan event is designated in a second argument. As the type of the push scan event, there are types such as scanning the read image as it is, performing OCR (Optical Character Reader) processing on the read image, and transmitting the read image by an electronic mail. For instance, an event ID for identifying these types is transferred as the second argument.

The application program is software which operates in the terminal device 20. The application program instructs an image read operation to the image reader 10 designated in the first argument, and acquires an image thus read. A certain process of the application program detects another process of the application program, and transfers the acquired image to the detected process. A certain process of the application program stores the acquired image and the image transferred from the other process of the application program as one file.

Figure 4:
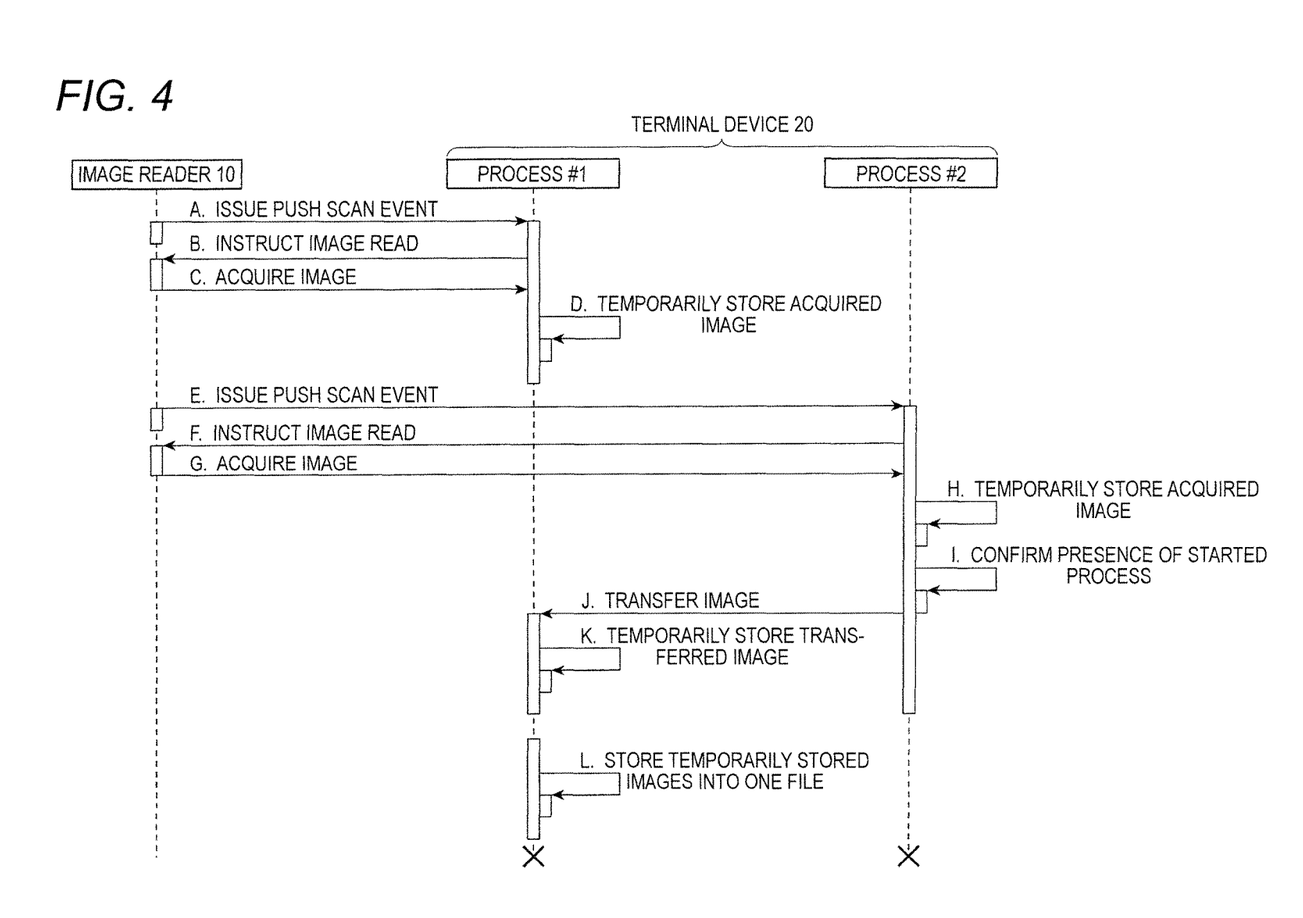
FIG. 4 is a sequence diagram illustrating an exemplary operation between the image reader and the terminal device according to the exemplary embodiment of the invention.

FIG. 4 is a sequence diagram illustrating an operation between the image reader 10 and the process of the application program when the images read by twice push scans are stored as one file.

Steps "A" to "D" indicate the sequence of a first push scan. The user designates the terminal device 20 at a storage destination of the image on the image reader 10, sets the original document as a target for reading the image, and instructs the start of the push scan. Then, the operation starts. When the operation starts, the image reader 10 issues the push scan event with respect to the terminal device 20 (A). Therefore, the application program is activated as Process #1. Process #1 instructs the image reader 10 to read the image (B), and acquires the image read by the image reader 10 (C). Then, Process #1 temporarily stores the acquired image (D).

Next, Steps "E" to "K" indicate the sequence of a second push scan. The user sets a target original document to be read on the image reader 10, and instructs the start of the push scan. Then, the operation starts. When the operation starts, the image reader 10 issues the push scan event with respect to the terminal device 20 (E). Therefore, the application program is activated as Process #2. Process #2 instructs the image reader 10 to read the image (F), and acquires the image read by the image reader 10 (G). Then, Process #2 temporarily stores the acquired image (H). Thereafter, Process #2 determines whether there is another activated process (1). Herein, since Process #1 is activated, Process #2 transfers the temporarily stored image to Process #1 (J). Therefore, Process #1 temporarily stores the transferred image (K). Process #2 is expired when the temporarily stored image is transferred to the other process.

Next, Step "L" indicates a sequence of storing the image. The user instructs the storing of the image on the display device 25 of the terminal device 20. The operation starts. When the operation starts, Process #2 stores the images temporarily stored in Steps D and K as one file (L).

Then, the description will be made about a screen which is displayed on the display device 25 of the terminal device 20 in Process #1 illustrated in FIG. 4.

Figure 5:
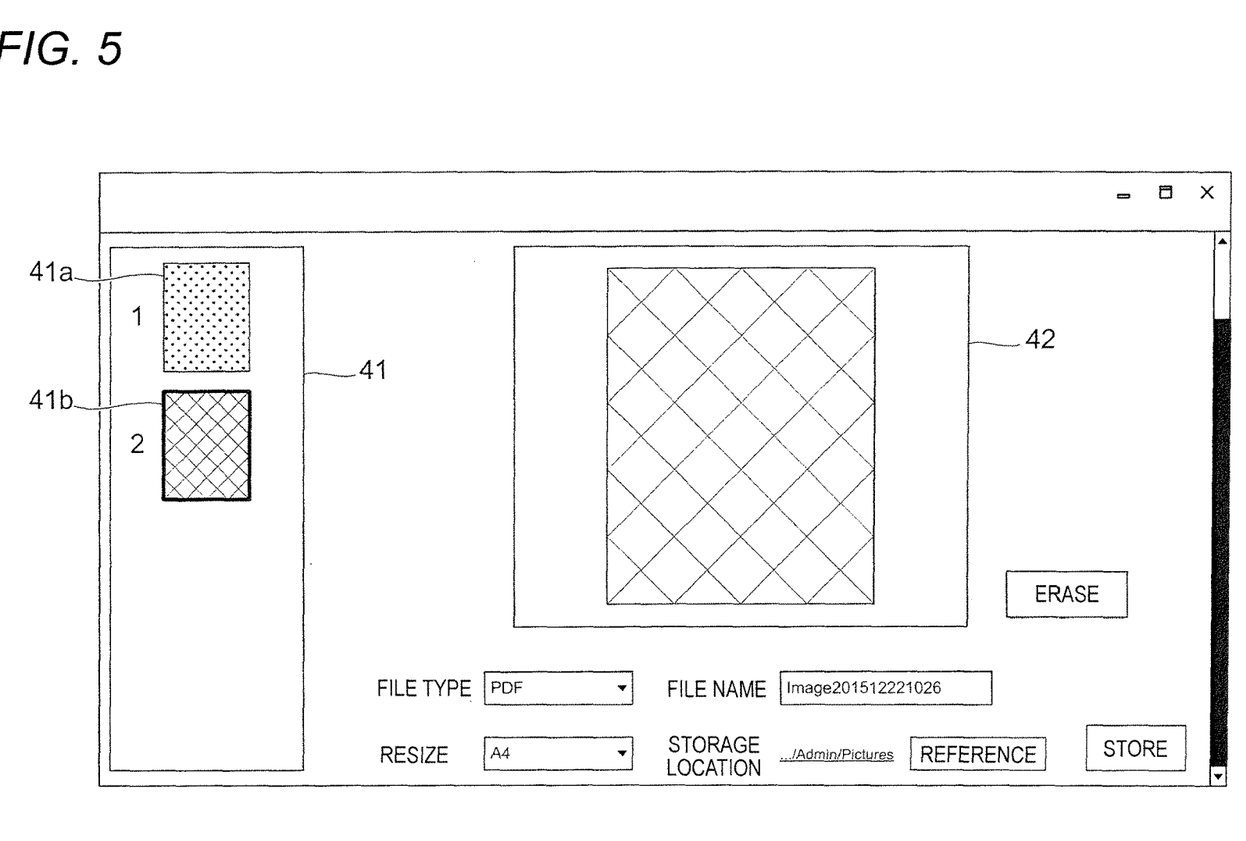
FIG. 5 is a diagram illustrating an exemplary screen after a user performs a first push scan to acquire an image read by the image reader.

FIG. 5 illustrates an exemplary screen after the user performs the first push scan and the image read by the image reader 10 is acquired in Process #1.

In this exemplary screen, the image read in the first push scan as an instance of a first operation is displayed in an image display area 41. Herein, it is assumed that two original documents are read in the first push scan. Therefore, two images 41a and 41b are displayed in the image display area 41 as an instance of a first image. In this state, when the image 41b with a bold line surrounded is selected, the image 41b is displayed in an image display area 42 on a magnified scale.

Figure 6:
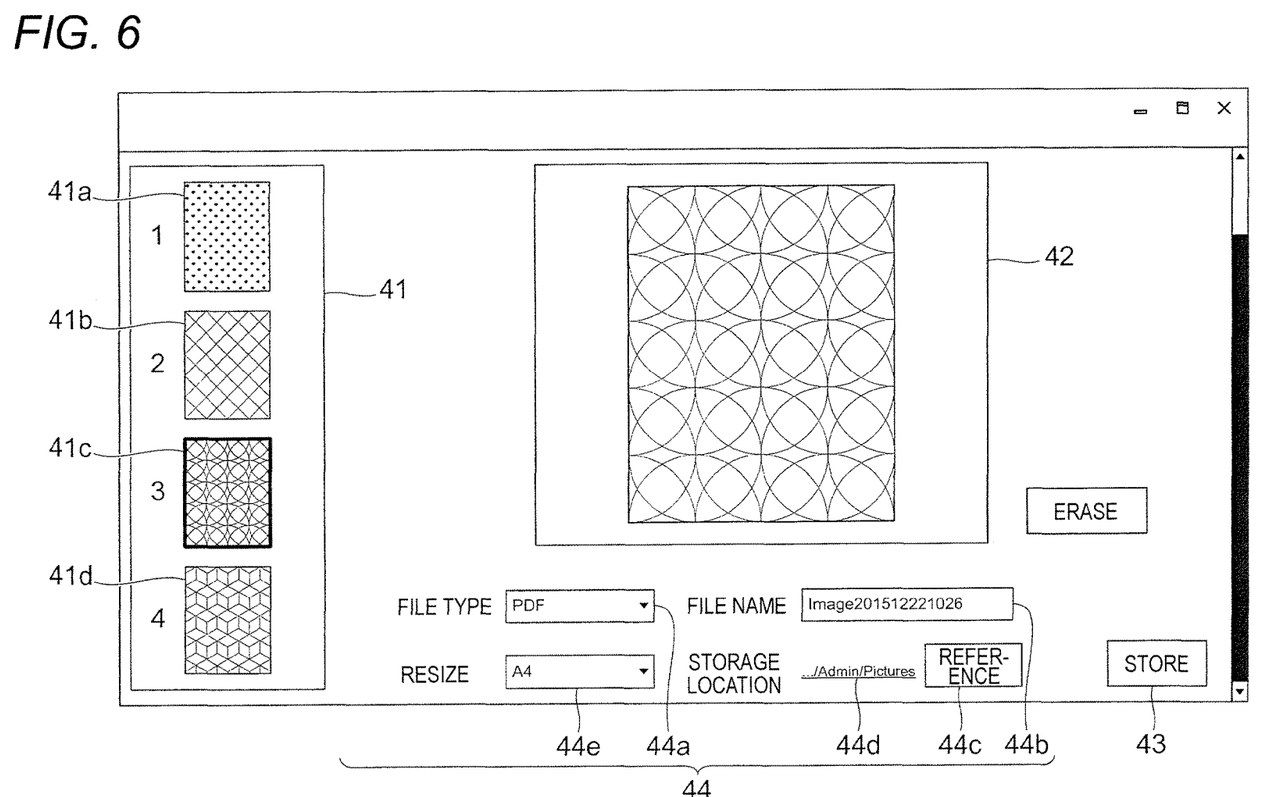
FIG. 6 is a diagram illustrating an exemplary screen after the image acquired by the image reader when the user performs a second push scan is integrated with the image acquired in the first push scan.

FIG. 6 illustrates an exemplary screen after the image acquired in Process #2 when the user performs the second push scan is integrated with the image acquired in the first push scan.

In the exemplary screen, the image read in the second push scan as an instance of a second operation is additionally displayed in the image display area 41. Herein, it is assumed that two original documents are read in the second push scan. Therefore, two images 41c and 41d are displayed in the image display area 41 as an instance of a second image in addition to two images 41a and 41b read in the first push scan. In this state, when the image 41c with a bold line surrounded is selected, the image 41c is displayed in an image display area 42 on a magnified scale.

Thereafter, when a store button 43 is pressed on the screen of FIG. 6, the images 41a to 41d displayed in the image display area 41 are stored as one file. The description herein has been made such that the images 41a to 41d are stored as one file when the store button 43 is pressed in a state where all the images 41a to 41d are displayed, but the invention is not limited thereto. For instance, when the store button 43 is pressed in a state where the images 41a and 41b or the images 41c and 41d are displayed, the images 41a to 41d may be stored as one file. In addition, a storage option setting area 44 is provided in this exemplary screen to set an option for storing a file. In other words, a type of a storing file to which the images 41a to 41d are contained is selected in a file type select field 44a. In a file name input field 44b, a name of a storing file to which the images 41a to 41d are contained is input. When a reference button 44c is pressed, a path of a storing file to which the images 41a to 41d are contained is selected and the selected path is displayed in a path display field 44d.

In addition, when the store button 43 is pressed as it is on the screen of FIG. 6, the images 41a to 41d displayed in the image display area 41 are stored in one file in the same size as that of the read original document. In this exemplary embodiment, when the image is resized before the store button 43 is pressed, the sizes of the images 41a to 41d displayed in the image display area 41 are changed. In this state, the images are stored in one file. For instance, the image read in the first push scan and the image read in the second push scan may be different in size. In such a case, a size after resizing is selected in a size-after-resizing select field 44e when the images contained in one file are resized to be arranged.

Figure 7:
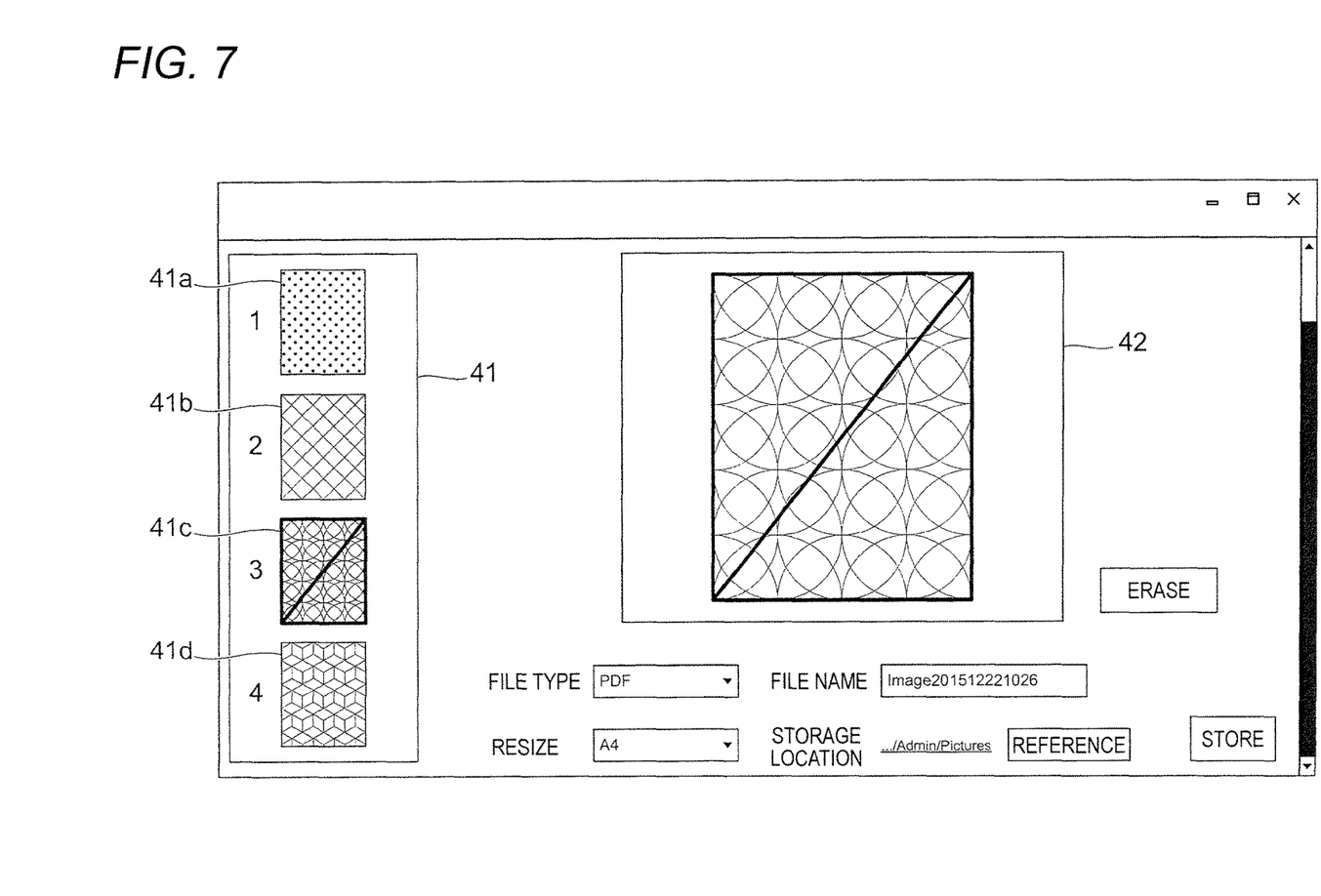
FIG. 7 is a diagram illustrating an exemplary screen in a case where an image unnecessary for storing is selected.

On the other hand, when the store button 43 is pressed as it is on the screen of FIG. 6, all the images 41a to 41d displayed in the image display area 41 are stored to be contained in one file. However, an image necessary for storing or an image unnecessary for storing may be selected among the images 41a to 41d displayed in the image display area 41. FIG. 7 illustrates an exemplary screen in a case where the image unnecessary for storing is selected. When the image 41c is selected as the image unnecessary for storing, a diagonal line is displayed on the image 41c in the image display area 41. In addition, at that time, the diagonal line on the image 41c is also reflected on the image display area 42. In this state, when the user instructs the storing of the image, the images 41a, 41b, and 41d having no diagonal line are stored in one file. Alternatively, while not illustrated in the drawing, the image unnecessary for storing may be selected from the images 41a and 41b, or the image unnecessary for storing may be selected from both the images 41a and 41b and the images 41c and 41d. These selected images are an instance of at least one of the first image and the second image.

[Functional Configuration of Image Integration Device]

Figure 8:
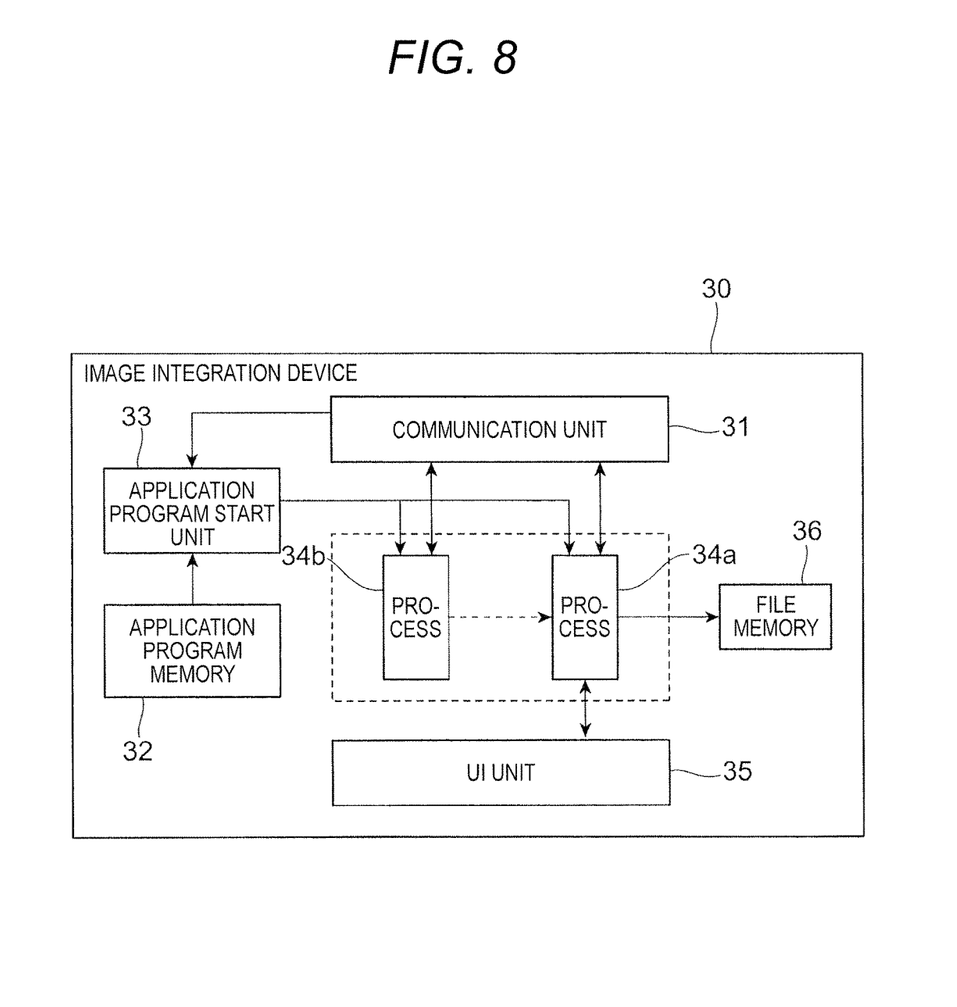
FIG. 8 is a block diagram illustrating an exemplary functional configuration of an image integration device according to the exemplary embodiment of the invention.

FIG. 8 is a block diagram illustrating an exemplary functional configuration of an image integration device 30 which operates in the terminal device 20. Herein, the image integration device 30 is an instance of an image storage device, and considered as a device which is realized such that the CPU 21 (see FIG. 3) of the terminal device 20 reads programs for realizing the respective functional sections described below from the HDD 23 (see FIG. 3) into the main memory 22, for instance (see FIG. 3), and executes the programs. As illustrated in the drawing, the image integration device 30 includes a communication unit 31, an application program memory 32, and an application program start unit 33. In addition, processes 34a and 34b generated when the application program start unit 33 starts the application program are also illustrated in a broken line in the drawing. Furthermore, the image integration device 30 includes a UI unit 35 and a file memory 36.

When the push scan event is issued by the image reader 10, the communication unit 31 receives the push scan event. When an image reading instruction is transmitted to the image reader 10 and an image is read by the image reader 10 in response, the read image is received. In this exemplary embodiment, the communication unit 31 is provided as an instance of a receiving unit which receives an image.

The application program memory 32 stores an application program for causing the terminal device 20 to perform a process in which the images separately read in plural times are integrated and stored into one file. The operation of the application will be described in detail below.

When receiving the push scan event from the communication unit 31, the application program start unit 33 reads the application program from the application memory 32 and starts the application program. At this time, the application program start unit 33 starts the application program while setting a device ID for identifying the image reader 10 issuing the push scan event to the first argument, and an event ID for identifying the type of the push scan event to the second argument. In this exemplary embodiment, the application program start unit 33 is provided as an instance of a start unit which starts the process.

The processes 34a and 34b are generated when the application program start unit 33 starts the application program. Herein, the process 34a is an instance of a first process (for instance, a process generated when the application program start unit 33 starts the application program according to the first push scan). In addition, the process 34b is an instance of a second process (for instance, a process generated when the application program start unit 33 starts the application program according to the second and later push scans).

In other words, the process 34a transfers the image reading instruction for the image reader 10 designated in the first argument to the communication unit 31, acquires the read image from the communication unit 31, temporarily stores the image, and displays the image in the UI unit 35. In addition, when the image is transferred from the process 34b, the process 34a also temporarily stores the transferred image, and displays the image in the UI unit 35. When the storing of the image is instructed from the UI unit 35, the temporarily stored images are integrated into one file. The file is stored in the file memory 36. Then, the process is ended.

In addition, the process 34*b* transfers the image reading instruction for the image reader 10 designated in the first argument to the communication unit 31, acquires the read image from the communication unit 31, and temporarily stores the image. The process 34*b* transfers the temporarily stored image to the process 34*a* already in progress, and is ended. Alternatively, when the process 34*a* already in progress is storing the images as one file, the process 34*b* may be operated not to transfer the image. In this case, the process 34*b* once holds the transferring of the image, and may be transfer the image after the process 34*a* ends the storing of the image as one file.

While the processes 34*a* and 34*b* are illustrated in the drawing, the number of performing processes is not necessarily limited to 2. For instance, only the process 34*a* may be performed during a period between the starting of the application program according to the first push scan and the starting of the application program according to the second push scan.

The UI unit 35 displays the image which is temporarily stored in the process 34*a*. In addition, the UI unit 35 instructs the process 34*a* to store the image. In this exemplary embodiment, the UI unit 35 is provided as an instance of a display to display the image.

When the process 34*a* is instructed from the UI unit 35 to store the images and integrates the temporarily stored images into one file, the file memory 36 stores the file. In this exemplary embodiment, the file memory 36 is provided as an instance of a memory which stores the first image and the second image into one file.

[Operation of Application Program]

The description will be made on an assumption that a process generated when the application program starts according to the first push scan is set to the process 34*a* in FIG. 8, a process generated when the application program starts according to the second and later push scans is set to the process 34*b*, and these processes perform different operations. However, the operations of the processes 34*a* and 34*b* are originally described in the same application program, and the operations of the processes 34*a* and 34*b* are merely different according to whether the application program starts at first or at second or later. In the following, the description will be made about an operation of the application program containing both operations of the processes 34*a* and 34*b*.

Figure 9:
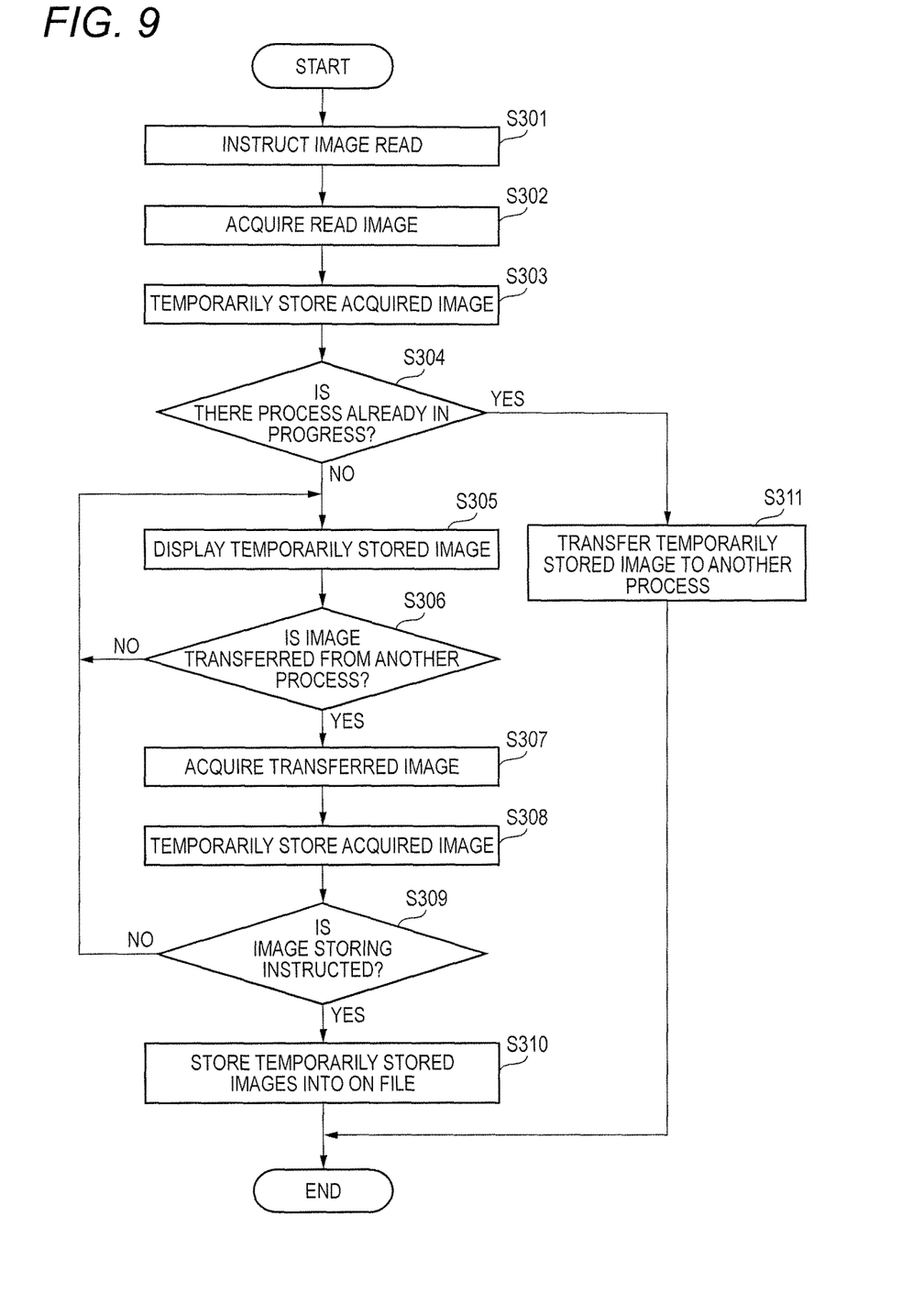
FIG. 9 is a flowchart illustrating an exemplary operation of an application program according to the exemplary embodiment of the invention.

FIG. 9 is a flowchart illustrating an exemplary operation of the application program. When the communication unit 31 receives the push scan event and the application program start unit 33 reads the application from the application program memory 32 and starts the application program, the operation starts.

When the operation starts, the application program first instructs the image reader 10 to read the image designated in the first argument (Step 301). For instance, the instruction may be performed such that the application program transfers information to instruct the image reading toward the communication unit 31, and the communication unit 31 transfers the information to the image reader 10.

Next, the application program acquires the image read by the image reader 10 (Step 302). For instance, the communication unit 31 receives the image read by the image reader 10, and the application program acquires the image from the communication unit 31. Therefore, the application program temporarily stores the acquired image (Step 303).

Next, the application program determines whether there is another process already in progress (Step 304). This determination may be made with reference to a flag stored in a memory shared between the processes. In other words, the process generated when the application program starts sets the flag to "ON" when the flag is "OFF", and determines that the process is generated by the first push scan and there is no other process already in progress. On the other hand, when the flag is already "ON", the process does not change the flag, and determines that there is the other process already in progress. At the time of ending, the process sets the flag to "OFF" when the flag has been set to "ON" by the process, or does not change the flag when the flag has not been set to "ON" by the process. The flag may be provided for each type of the push scan event designated in the second argument, for instance. Then, the application program comes to determine whether there is another process already in progress which corresponds to the same type of the push scan event. Herein, the type of the push scan event is an instance of the process.

First, the description will be made about a case where it is determined that there is no other process already in progress in Step 304. In this case, the application program displays the temporarily stored image in the UI unit 35 as illustrated in FIG. 5, for instance (Step 305). Then, the application program determines whether an image is transferred from the other process (Step 306). When it is determined that the image is transferred from the other process, the application returns to Step 305. At that time, the UI unit 35 remains, for instance, in a state where the screen of FIG. 5 is displayed. On the other hand, when it is determined in Step 306 that the image is transferred from the other process, the application program acquires the transferred image (Step 307). Therefore, the application program temporarily stores the acquired image (Step 308).

Thereafter, the application program determines whether an image storing is instructed from the UI unit 35 (Step 309). When it is determined that the image storing is instructed, the application program returns to Step 305. At that time, the screen of FIG. 6 is displayed in the UI unit 35, for instance. Then, the application program performs the process up to Step 308 again. On the other hand, when it is determined in Step 309 that the image storing is instructed, the application program integrates the temporarily stored images into one file and stores the file in the file memory 36 (Step 310). Then, the process is expired.

In addition, the description will be made about a case where it is determined in Step 304 that there is another process already in progress. In this case, the application program transfers the temporarily stored image to the other process already in progress (Step 311). Then, the process is expired.

[Program]

The process performed by the image integration device 30 according to this exemplary embodiment is prepared as a program such as application program software, for instance.

In other words, the program for realizing this exemplary embodiment causes a computer to execute a function of receiving an image reading according to an operation from an image reader, a function of displaying, in a case where the program does not perform another process when the image is received, a first image which is the received image, a function of transferring, in a case where the program performs the other process when the image is received, the received image to the other process, a function of further displaying, in a case where the program does not perform the other process when the image is received, a second image which is the transferred image, and a function of integrating the first image and the second image into one file and storing the file when the first image and the second image are instructed to be stored in a state where the first image or the second image is displayed in a case where the program does not perform the other process when the image is received.

The program for realizing this exemplary embodiment may be provided through a communication unit, or may be provided by being stored in a recording medium such as a CD-ROM.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image storage device comprising:
a receiving unit that receives a first image read in a first process activated by a first operation from an image reader and receives a second image read in a second process activated by a second operation from the image reader, the second operation subsequent to the first operation;
a determining unit that determines whether the first process is active or not while the second process is active;
a display that displays the first image and, if the determining unit determines that the first process is active, further displays the second image; and
a memory that stores the first displayed image and the second displayed image as one file.

2. The image storage device according to claim 1, wherein, when a portion of at least one of the first image and the second image is selected in a state where the first image or the second image is displayed on the display and then the first image and the second image are instructed to be stored, the memory stores a file including the first image and the second image except the portion.

3. The image storage device according to claim 1, wherein, when at least one of the first image and the second image is resized in a state where the first image or the second image is displayed on the display and then the first image and the second image are instructed to be stored, the memory stores a file including the resized image of the first image and the second image.

4. The image storage device according to claim 1, further comprising:
a start unit that starts a first process according to the first operation and starts a second process according to the second operation,
wherein the first process outputs the first image to the display when the receiving unit receives the first image,
the second process transfers the second image to the first process when the receiving unit receives the second image,
the first process further outputs the second image to the display when the second image is transferred by the second process, and
when the first image and the second image are instructed to be stored in a state where the first image or the second image is displayed on the display, the first process integrates the first image and the second image into a file and outputs the file to the memory.

5. The image storage device according to claim 4, wherein the second process does not transfer another image to the first process while the first process integrates the first image and the second image into the file and outputs the file to the memory.

6. The image storage device according to claim 4, wherein the second process transfers the second image to the first process corresponding to a process associated with the second process when the receiving unit receives the second image.

7. The image storage device according to claim 1, wherein the first image is displayed in a window, and the second image is added to the window when displayed.

8. The image storage device according to claim 7, wherein the first process expires when the second image is displayed in the window.

9. The image storage device according to claim 1, wherein more than one first image is read in the first process and more than one second image is read in the second process, the display displays the more than one first image and the more than one second image, and the memory stores the more than one first displayed image and the more than one second displayed images as one file.

10. An image storage system, comprising:
an image reader that reads an image recorded in a recoding medium; and
an image storage device that stores the image read by the image reader,
wherein the image reader includes
a reading unit that reads a first image according to a first operation, and then reads a second image according to a second operation, the second operation being subsequent to the first operation, and
the image storage device includes:
a receiving unit that receives the first image read in a first process activated by the first operation and receives the second image read in a second process activated by the second operation;
a determining unit that determines whether the first process is active or not while the second process is active;
a display that displays the first image and, if the determining unit determines that the first process is active, further displays the second image; and
a memory that stores the first displayed image and the second displayed image as one file.

11. A non-transitory computer readable medium storing a program causing a computer to execute a process for image storage, the process comprising:
receiving an image read according to an operation from an image reader;
displaying, in a case where the program does not perform another process when the image is received, a first image which is the received image;
transferring, in a case where the program performs the another process when the image is received, the received image to the another process;
further displaying, in a case where the program does not perform the another process when the image is received, a second image which is the transferred image; and
storing a file into which the first image and the second image are integrated when the first image and the second image are instructed to be stored in a state where the first image or the second image is displayed in a case where the program does not perform the another process when the image is received.

12. An image storing method implemented as a program, the method comprising:
- receiving an image read according to an operation from an image reader;
- displaying, in a case where the program does not perform another process when the image is received, a first image which is the received image;
- transferring, in a case where the program performs the another process when the image is received, the received image to the another process;
- further displaying, in a case where the program does not perform the another process when the image is received, a second image which is the transferred image; and
- storing a file into which the first image and the second image are integrated when the first image and the second image are instructed to be stored in a state where the first image or the second image is displayed in a case where the program does not perform the another process when the image is received.

* * * * *